United States Patent [19]
Fujiki

[11] Patent Number: 6,061,319
[45] Date of Patent: May 9, 2000

[54] OPTICAL DISK REPRODUCING APPARATUS AND OPTICAL DISK REPRODUCING METHOD

[75] Inventor: Toshihiro Fujiki, Tokyo, Japan

[73] Assignee: Sony Corporation, Tokyo, Japan

[21] Appl. No.: 09/372,118

[22] Filed: Aug. 11, 1999

[30] Foreign Application Priority Data

Aug. 12, 1998 [JP] Japan ................................. 10-228195

[51] Int. Cl.[7] .................................................. G11B 7/00
[52] U.S. Cl. ............................................................. 369/59
[58] Field of Search ................................ 369/59, 58, 47, 369/48

[56] References Cited

U.S. PATENT DOCUMENTS

| | | | |
|---|---|---|---|
| 5,359,586 | 10/1994 | Izumi et al. | 369/59 |
| 5,420,844 | 5/1995 | Kawakubo et al. | 369/59 |
| 5,959,942 | 4/1997 | Taguchi et al. | 369/59 |

*Primary Examiner*—Nabil Hindi
*Attorney, Agent, or Firm*—Jay H. Maioli

[57] ABSTRACT

Disclosed are a reproducing apparatus and a reproducing method in which a run length code to be recorded on a disc is subjected to a modulation in a width direction to multiplex sub data, and an offset at a time of signal level detection is reduced.

14 Claims, 7 Drawing Sheets

OPTICAL DISK REPRODUCING APPARATUS AND OPTICAL DISK REPRODUCING METHOD

BACKGROUND OF THE INVENTION

1. Field of the Invention

The present invention relates to a reproducing apparatus and a reproducing method in which when a run length limited code to be recorded on a disc is subjected to modulation in its width direction to superimpose a sub-data train, an offset upon detecting a signal level is reduced.

2. Description of the Related Art

A so-called pit top disperse recording method is incorporated by reference U.S. patent application Ser. No. 09/213012) filed in Dec. 16, 1998 by the same applicant of the present invention.

The above-mentioned pit top dispersion recording method is such a recording method in which a pit or land alternatively a mark or space is subjected to a modulation in its width direction to thereby superimpose and record a sub data train. The sub data train can be reproduced by detecting the sub data train from a fine modulation signal included in a reproduced signal and demodulating the same.

In a case where encryption is applied to a main data so as to protect a copy right, for example, the above sub data is a key for decoding the encryption or is a code to discriminate a normal disk from a pirated disk.

A first method to increase the detection sensitivity for the sub data train is such that, for recording the sub data, the number of pits or marks alternately lands or spaces, to which the pit top dispersion recording method is applied, is increased to thereby improve an S/N ratio (signal to noise ratio). Specifically, by increasing the number of pits or marks, or lands or spaces which are modulated in width direction on an optical disk, the S/N ratio is improved.

A second method to increase the detection sensitivity for the sub data train is such that the amount of a fine modulation signal to pits or marks alternately lands or spaces, to which the pit top dispersion recording method is applied, is increased to thereby improve an S/N ratio.

Specifically, by increasing the depth of concave portions or projection of convex portions pits or marks, or lands or spaces which are modulated in width direction on the optical disk, the S/N ratio is improved.

A third method to increase the detection sensitivity for the sub data train is such that, in order to detect pits or marks alternately lands or spaces to which the pit top dispersion recording method is applied, all the pits or marks alternately lands or spaces are sampled at a predetermined timing to correct a bias between generation probability of 1 and generation probability of 0 (difference between generation frequencies), thereby improving the S/N ratio.

Specifically, when a disk identification code SC1 described in the above-mentioned U.S. patent application Ser. No. 09/213012 is modulated on the basis of an M sequence random number data, by correcting the bias between generation probabilities of 0 and 1 within a predetermined period, it is possible to improve the S/N ratio.

A fourth method to increase the detection sensitivity for the sub data train is such that by normalizing an accumulation result of the generation number of 1 and the generation number of 0 within the predetermined period generated in the M sequence random number generation portion on the basis of the frequency of the above sampled value, it is possible to improve the S/N ratio.

However, the first to fourth methods for improving the S/N ration which is the detection sensitivity of the sub data train have the drawbacks as mentioned hereinbelow.

The first method has a disadvantage such that since the number of pits or marks, or lands or spaces, to which the pit top dispersion recording method is applied, is increased, it takes long period of time to detect the sub data train.

The second method has a disadvantage such that since the modulation amount is increased, the recorded sub data train causes a cross-talk on the main data train and easily exerts bad influence. Further, there is also a disadvantage such that when the modulation amount of the sub data train is increased, it can be easily demodulated. Thus, it is easily duplicated and altered a malicious third party, so that the effect for preventing the forgery and so on are lost.

The third method has a disadvantage such that since a timing of sampling depends on the pit or mark or land or space which are the main data train is determined irrespective of the sub data train, it is substantially impossible to correct the bias in the number of sampling results.

The fourth method has a disadvantage such that since there is required an arithmetic unit for carrying out a dividing for one accumulated result based on the accumulation result of the generation number of 0 and the generation number of 1 for performing the normalization, the circuit becomes large-scaled and complicated.

SUMMARY OF THE INVENTION

It is therefore an object of the invention to provide a reproducing apparatus and a reproducing method, in which the number of pits or marks, or lands or spaces, to which the pit top dispersion recording method is applied, is made as small as possible, the modulation amount of the sub data train is controlled to be fine and the sub data train is reproduced whose S/N ratio is being improved by a simple arrangement.

According to an aspect of the present invention, there is provided a reproducing apparatus for reproducing an optical disc in which main data is recorded as a mark or space subjected to a run length limited coding process and sub data is subjected to a modulation process in a width direction of a mark or space having a predetermined run length and is recorded, comprising:

a reproducing means for irradiating a light on the mark or space on the optical disc and generating a reproducing signal based on a reflection signal from the optical disc;

a binary-coding means for binary-coding the reproducing signal reproduced by the reproducing means;

a clock generating means for generating a clock signal based on a signal binary-coded by the binary-coding means;

a mark/space detecting means for detecting a mark or space having the predetermined run length based on the clock signal from the clock generating means and the binary-coded signal from the binary-coding means;

an A/D converting means for converting a reproduced signal from the reproducing means into a digital signal based on the clock signal from the clock generating means;

a sample and hold means for sampling and holding the digital signal converted by the A/D converting means based on a detected result of the mark/space detecting means; and an offset reducing means for removing an offset of a sampled and held signal from the sample and hold means; and a demodulating means for demodulating sub data subjected to a modulating process in a width direction of the mark or space having the predetermined run length and then recorded based on the sampled and held signal the offset of which is removed by the offset reducing means.

According to another aspect of the present invention, there is provided a reproducing method for reproducing an optical disc in which main data is recorded as a mark or space subjected to a run length limited coding process and sub data is subjected to a modulation process in a width direction of a mark or space having a predetermined run length and is recorded, comprising the steps of:

a step for irradiating a light on the mark or space on the optical disc and generating a reproduced signal based on a reflection signal from the optical disc;

a step for binary-coding the reproduced signal;

a step for generating a clock signal based on a binary-coded signal;

a step for detecting a mark or space having the predetermined run length based on the generated clock signal and the binary-coded signal;

a step for converting the reproduced signal into a digital signal based on the generated clock signal;

a step for sampling and holding the converted digital signal based on a detected result of the mark/space;

a step for removing an offset of the sampled and held signal; and a step for demodulating sub data subjected to a modulating process in a width direction of the mark or space having the predetermined run length and then recorded based on the sampled and held signal the offset of which is removed.

DESCRIPTION OF THE PREFERRED EMBODIMENT

An embodiment of the present invention will be described with respect to an example of reproduction using a compact disc.

Figure 1:
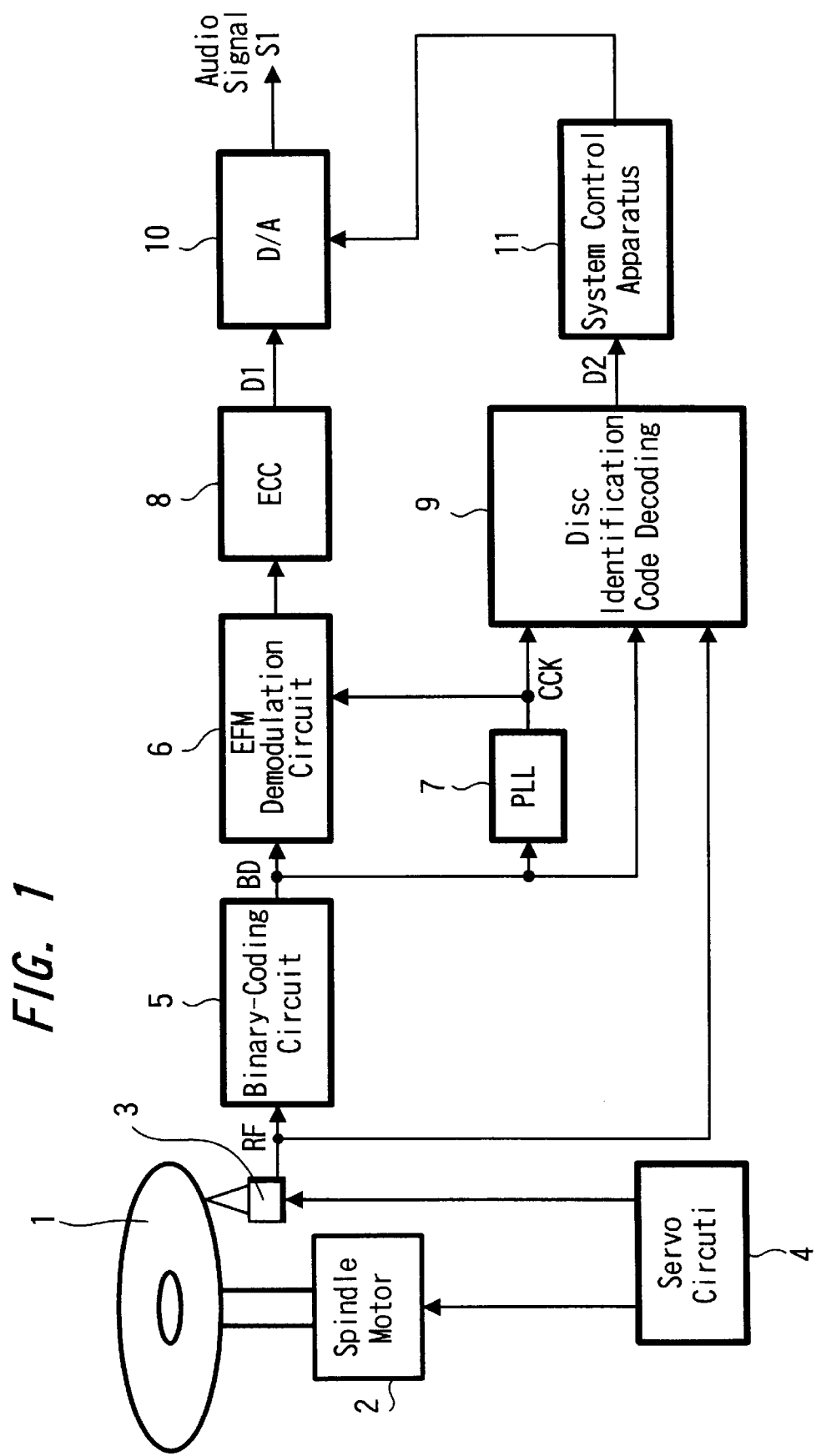
FIG. 1 is a block diagram showing the construction of an optical disc reproducing apparatus to which the present invention is applied.

FIG. 1 is a block diagram showing the construction of an optical disc reproducing apparatus for reproducing a compact disc 1 on which a sub data train is multiplexed and recorded on a main data train.

In FIG. 1, a compact disc 1 is rotated by a spindle motor 2. A servo circuit 4 rotates the spindle motor 2 at a constant linear velocity and controls so as to perform predetermined operations such that the focal point of a laser beam emitted by an optical pickup 3 is adjusted onto a pit and land train on the compact disc 1. The optical pickup 3 receives a return light of the laser light irradiated onto the compact disc 1 and outputs a reproduction RF signal RF whose signal level is changed according to the light amount of the return light. The outputted reproduction RF signal RF is supplied to both of a binary-coding circuit 5 and a disc identification code decoding circuit 9.

The binary-coding circuit 5 performs the binary-coding based on the supplied reproduction RF signal RF, thereby generating a binary-coded signal BD whose logic "1" of the logical level corresponds to a pit and logic "0" corresponds to a land. The binary-coded signal BD is supplied to a PLL circuit 7, an EFM (Eight to Fourteen) demodulating circuit 6, and the disc identification code decoding circuit 9.

The PLL circuit 7 generates a channel clock CCK on the basis of the supplied binary-coded signal BD. The generated channel clock CCK is supplied to the EFM demodulating circuit 6 and the disc identification code decoding circuit 9 to thereby instruct the operational timings of the circuits 6 and 9.

The EFM demodulating circuit 6 demodulates EFM data from the binary-coded signal BD by using the channel clock CCK as a reference, then divides the demodulated EFM data at every eight bit unit by using a frame sync (synchronizing) pattern included in the EFM data as a reference, and supplies the generated data at the 8-bit unit into an ECC (Error Correcting Code) circuit 8.

The ECC circuit 8 corrects an error caused by a defect on the disc or the like on the basis of an error correction code added to the output data of the EFM demodulating circuit 6. The ECC circuit 8 thereby reproduces a digital audio signal D1 and supplies it to a digital-to-analog converter 10.

The disc identification code decoding circuit 9 decodes disc identification data D2 on the basis of the channel clock CCK, the binary-coded signal BD, and the reproduction RF signal RF which are supplied thereto. The decoded disc identification data D2 is supplied to a system control circuit 11. The system control circuit 11 restricts the operation of the reproducing apparatus in accordance with the disc identification code. For example, when it is determined that the disc identification code is not correctly recorded, it is decided that the disc is an illegally copied disc and an enable terminal of the digital-to-analog converter 10 is therefore controlled so that reproduction of an audio signal S1 can be stopped.

On the compact disc 1, there are recorded digital audio data obtained by digitizing an audio signal as a main data, sub code data indicative of the music number, elapsed time in a music or the like, and an error correction code and the EFM data subjected to a data process specified according to the compact disc is recorded as a change in length of a pit and a land.

Figure 2:
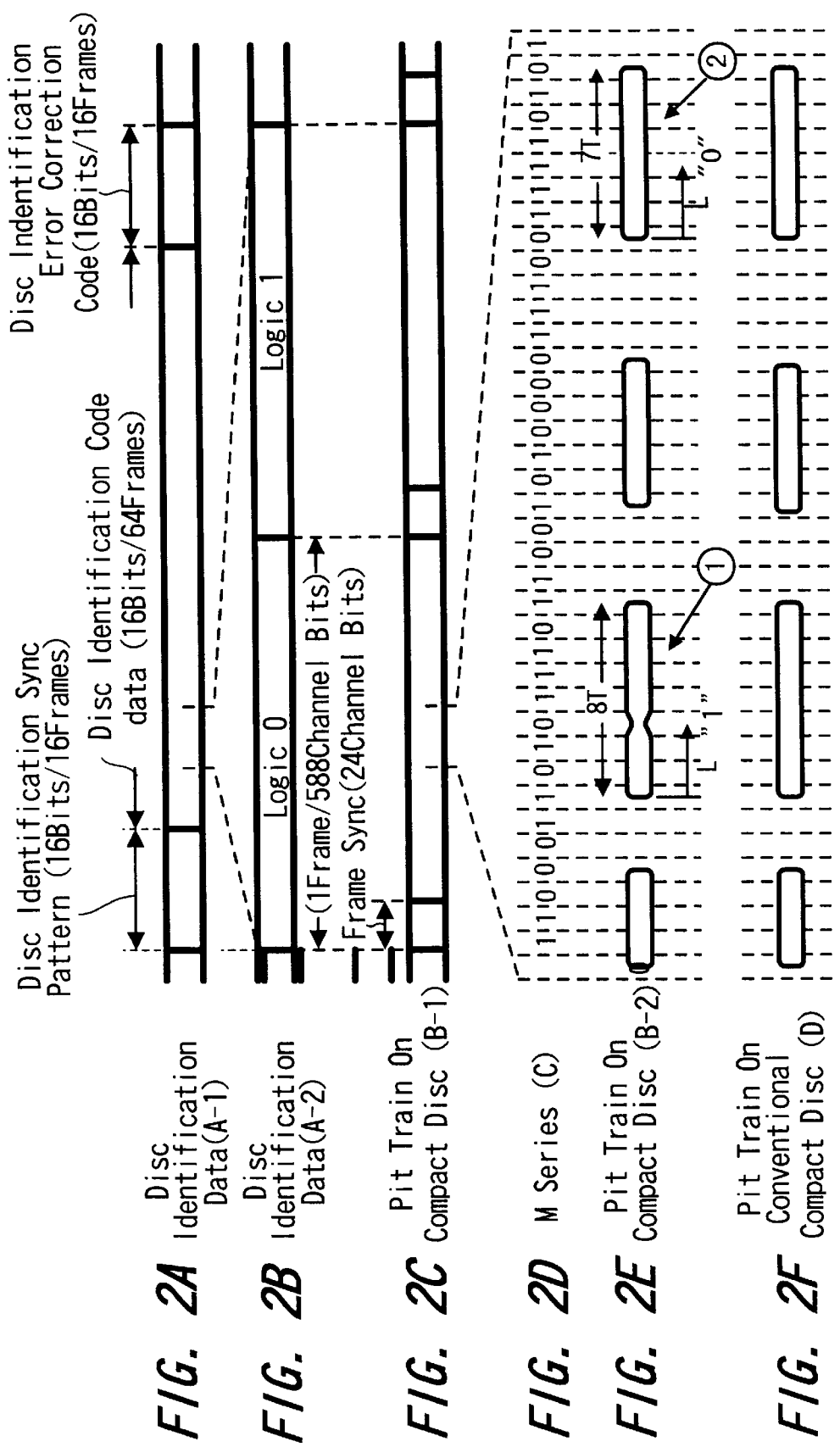
FIG. 2A shows a disc identification code multiplexed on an optical disk as sub data.
FIG. 2B shows a format of the disc identification code.
FIG. 2C shows a pit train recorded on the optical disc at every frame period.
FIG. 2D shows an M series changed at a channel bit interval.
FIG. 2E shows a pit train on an optical disc 1 to which the present invention is applied.
FIG. 2F shows a pit train on a conventional optical disc.

Further, on the compact disc 1, perfectly independent of the digital audio data and the sub code data, a disc identification code comprised of disc identification data, a sync pattern showing the beginning of the disc identification data, and the error correction code to the disc identification data shown in FIG. 2A is multiplexed and recorded as a sub data train on a pit.

The disc identification data is data such as ID information set for every disc master, which is used to form a compact disc, peculiar information of a manufacturing factory, the date of manufacture, information for controlling whether the disc can be copied or not and the like.

As shown in a recording format of FIG. 2B, the disc identification code is recorded one bit each per frame, with the head of each frame of the compact disc 1 as a border. As shown in FIG. 2C, one frame of the compact disc consists of 588 channel bits. At the head of each frame, a frame sync pattern consisting of 24 channel bits is inserted. The channel bit length is expressed by T.

A pit on which the disc identification code is recorded is a pit having the length of 7T or longer. As shown in FIG. 2E, in pit trains on the compact disc 1, a pit having the length of 7T or longer is either a pit (1) having a narrow width at a position apart from the leading edge of the pit only by a distance L or a pit (2) whose width has no change like a pit train on a conventional compact disc as shown in FIG. 2F. The pit is determined by the positional relation between an M series which changes at a channel bit interval shown in FIG. 2D and the leading edge of the pit. Specifically, when the exclusive OR between the logical level of the M series at the leading edge of the pit and the logical level of the disc identification code is logic "1", the pit width at a specific position is narrow (1). When it is the logic level "0", there is no change in the pit width (2). That is, the disc identification code is modulated by the M series.

The M series shown in FIG. 2D is a pseudo random binary series which is initialized at the head of the frame sync pattern and in which the same pattern is repeated at one frame period.

Figure 3:
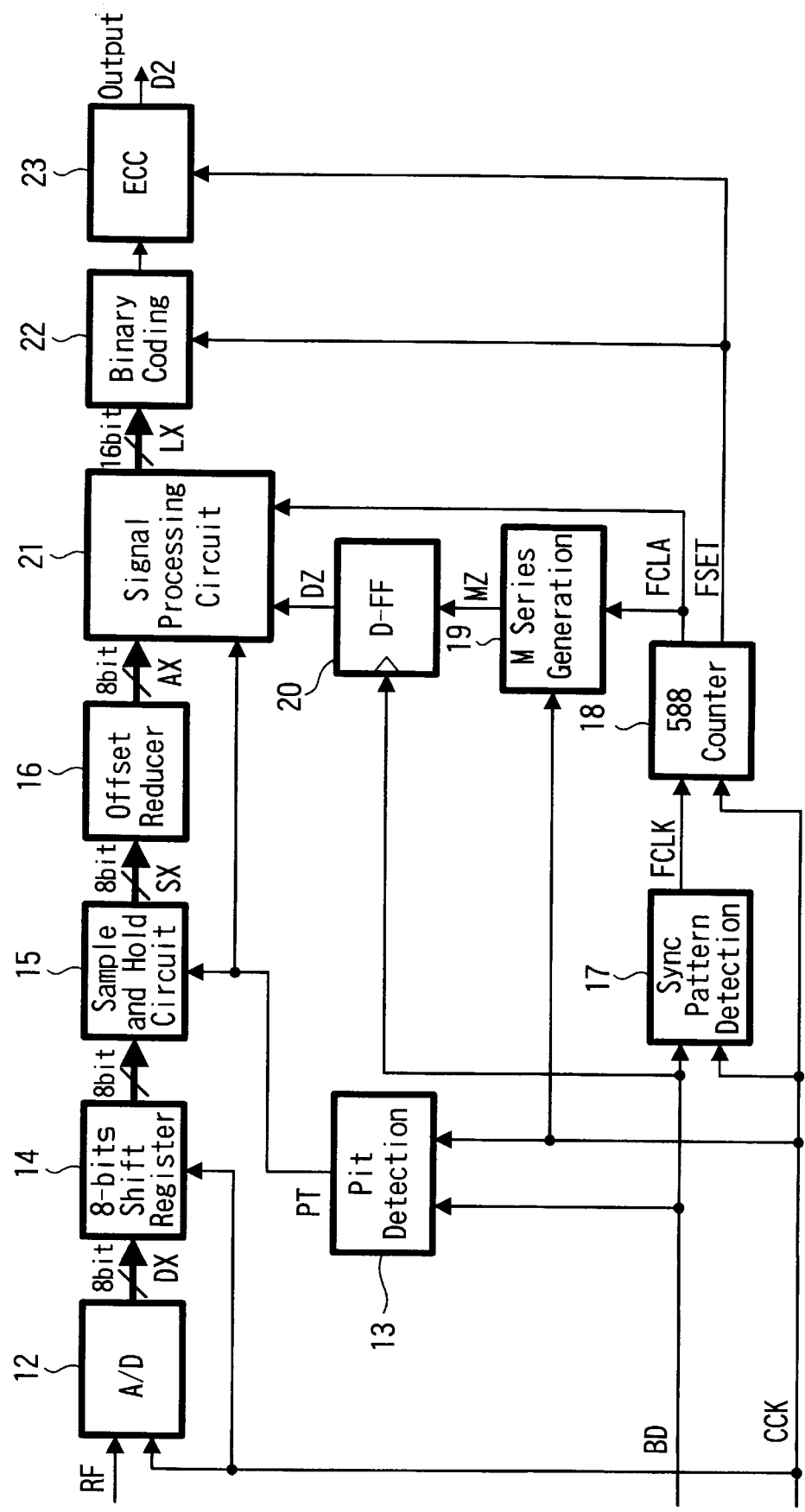
FIG. 3 is a block diagram showing the detailed construction of the inside of a disc identification code decoding circuit 9 shown in FIG. 1.

A disc identification code decoding circuit shown in FIG. 3 is a block diagram illustrating in detail the disc identification code decoding circuit 9 in FIG. 1.

An analog-to-digital converter 12 converts the reproduction RF signal RF into an 8-bit digital RF signal DX at a timing determined by the channel clocks CCK.

A shift register 14 adjusts the timing so that a sample and hold circuit 15 samples and holds the signal level at the position apart from the leading edge of the pit of the digital RF signal DX by about a distance L at the timing of the pit detection signal PT of the pit detecting circuit 13.

Figure 4:
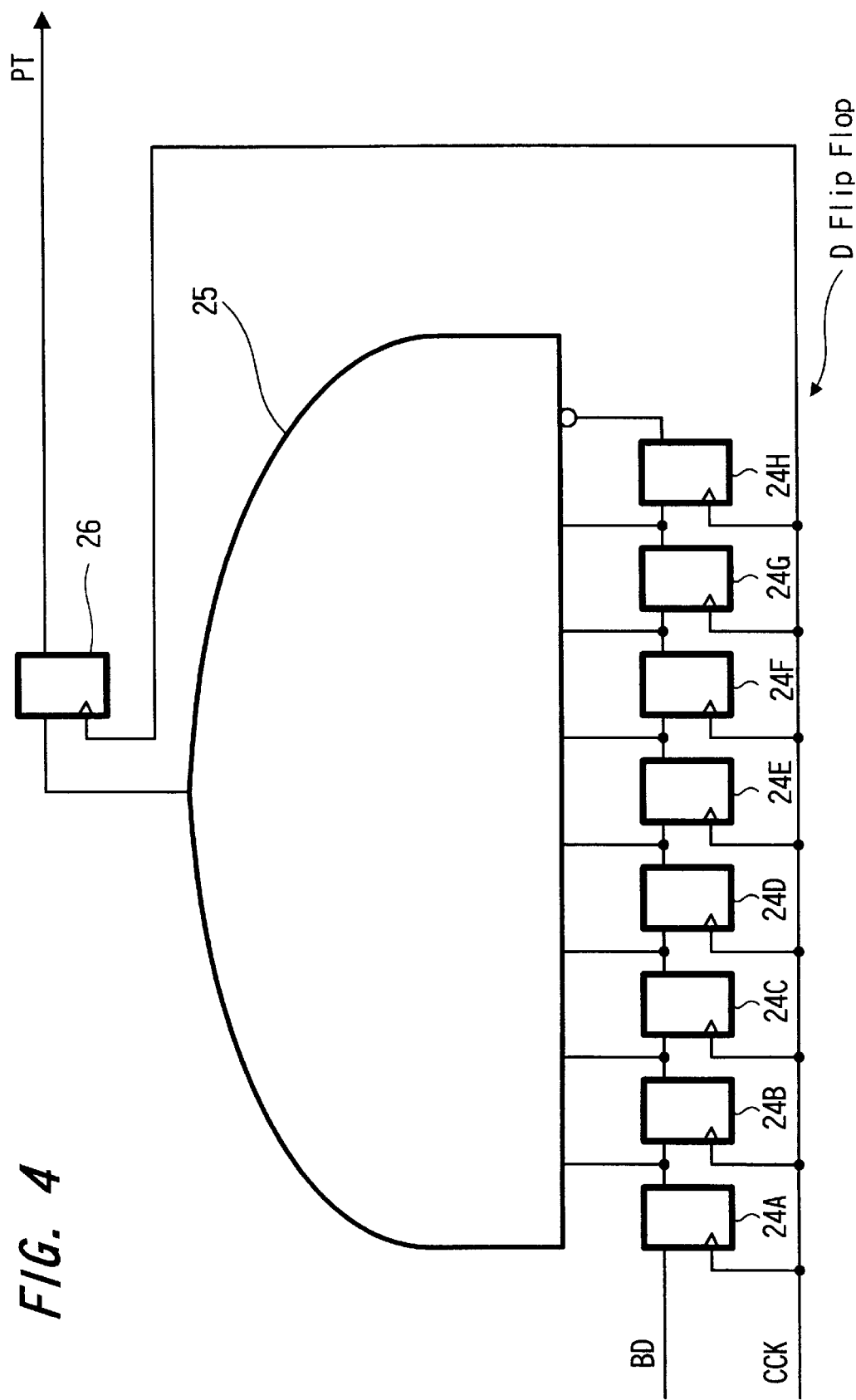
FIG. 4 is a block diagram showing the detailed construction of the inside of a pit detecting circuit 13 shown in FIG. 3.

A practical construction of the pit detecting circuit 13 is shown in FIG. 4.

D flip flops 24A to 24H of eight stages sequentially latch and transfer the binary-coded signal BD synchronously with the channel clocks CCK. An AND circuit 25 receives outputs of the D flip flops 24A to 24H in parallel. At this time, the AND circuit 25 inverts the logic level of the output of only the D flip flop 24H at the final stage, receives the resultant signal, and outputs an AND signal of the parallel inputs. Thus, the AND circuit 25 outputs an AND signal which rises to the logic "1" when the binary-coded signal BD is seen in the channel clock CCK cycle and logic "1" is continued seven times from one logic "0", that is, only when the pit having the length of 7T or longer is formed.

A D flip flop 26 latches the output of the AND circuit 25 and outputs a pit detection signal PT.

The sample and hold circuit 15 outputs modulation part data SX as a signal level of a part in which the sampled and held disc identification code is recorded to an offset reducer 16.

Figure 5:
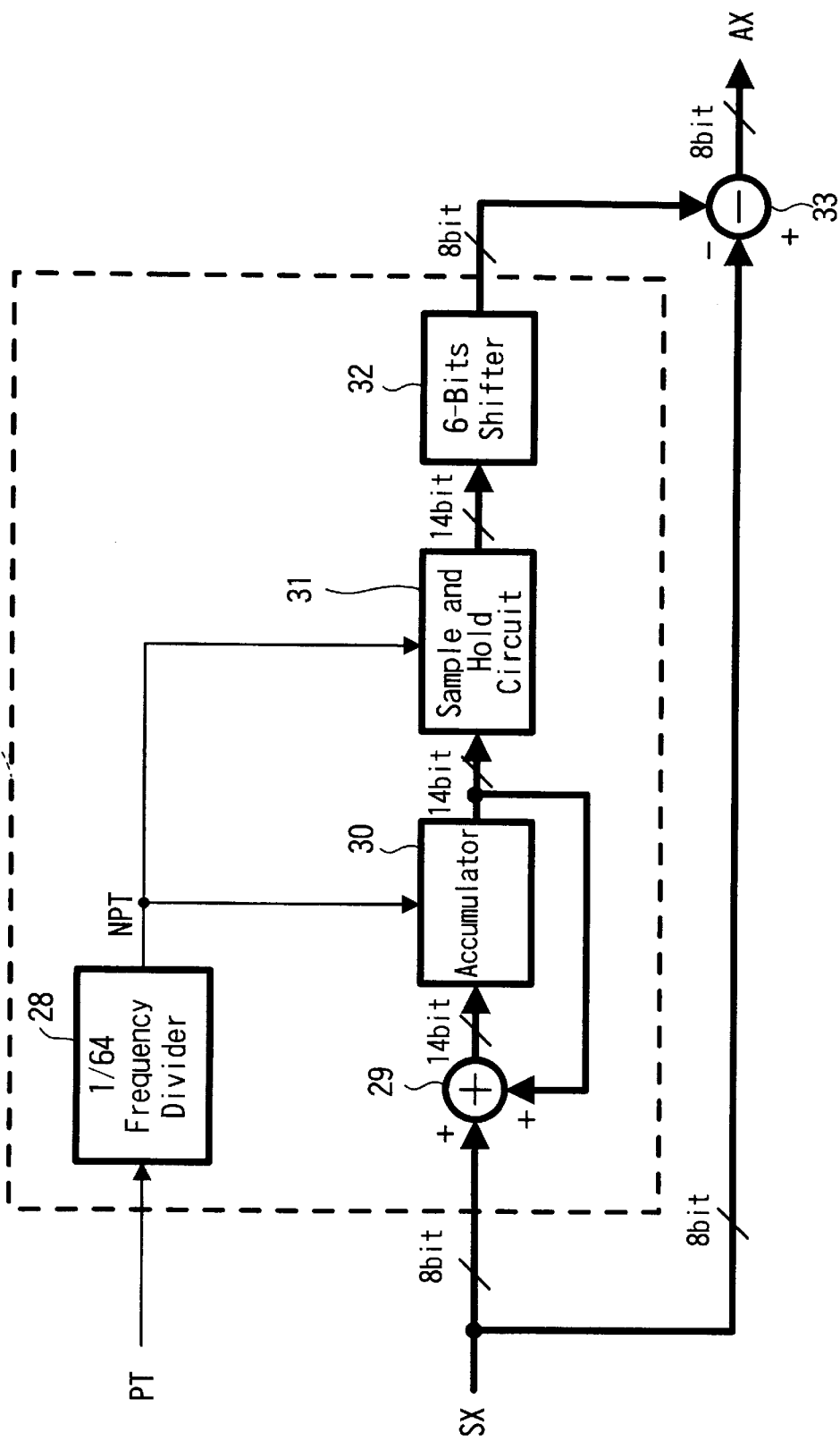
FIG. 5 is a block diagram showing the detailed construction of the inside of an offset reducer 16 shown in FIG. 3.

The practical construction of the offset reducer 16 is shown in FIG. 5.

A block surrounded by a dotted line denotes an offset detecting block 27. A frequency divider 28 performs 1/64 frequency division on the pit detection signal PT and outputs a frequency division signal NPT.

On the other hand, the inputted modulation part data SX is code extended to 14 bits and added with an output from an accumulator 30 by an adder 29. The accumulator 30 comprises a memory of 14 bits for holding output data of the adder 29 and feeds back the held data to the adder 29, thereby constructing an accumulating adder. The held data of the accumulator 30 is cleared by the frequency division signal NPT and the data held by a sample and hold circuit 31 is outputted to a 6-bit shifter circuit 32. The data outputted to the shifter circuit 32 is data obtained by adding the value of the modulation part data SX 64 times.

The shifter circuit 32 shifts the output of the sample and hold circuit 31 by six bits to the right and outputs the resultant. That is, since the shifter circuit 32 outputs the data obtained by dividing the output of the sample and hold circuit 31 by 64, a value obtained by sampling and averaging the value of the modulation part data Sx by 64 is resulted and a rough offset value of the modulation part data SX is outputted.

A subtractor 33 subtracts the output of the shifter circuit 32 from the modulation part data SX and outputs an offset reduced output AX in which an offset is reduced from the modulation part data SX.

In FIG. 3, a sync pattern detector 17 detects from the binary-coded signal BD and from the reproduced channel clock CCK a frame sync pattern detected once per 588 clock and outputs a frame clock FCLK generated at the head of a frame to a 588 counter 18.

The 588 counter 18 is reset to "0" by the frame clock FCLK and counts the number of the channel clocks CCK from 0 to 587. When the count value is 586, a clear signal FCLR is outputted, while when the count value is 555, a setting signal FSET is outputted. That is, the clear signal FCLR is outputted at the head of the frame in a manner similar to the frame clock FCLK and the setting signal FSET is outputted before the head of the next frame.

An M series generating circuit 19 comprises a plurality of D flip flops which are cascade connected and an exclusive OR circuit. After setting an initial value to each of the plurality of D flip flops by the reset signal FCLR, the set data is sequentially transferred synchronously with the channel clock CCK, and fed back between predetermined D flip flops, thereby generating an M-series signal MZ. The M series signal MZ is an M series which is completely the same as that shown in FIG. 2D used to form pits of the compact disc 1 and the initial value is also the same as that in the M series at the head of the frame.

A D flip-flop 20 latches the M series signal MZ at the leading edge of the binary-coded signal BD and outputs the M series latch output DZ to a signal processing circuit 21. The value of the M series latch output DZ is a value at the leading edge of the pit in the M series in FIG. 2D. In the case of the above mark or space, the M series latch output DZ represents the value of the leading edge of mark or falling edge of space.

Figure 6:
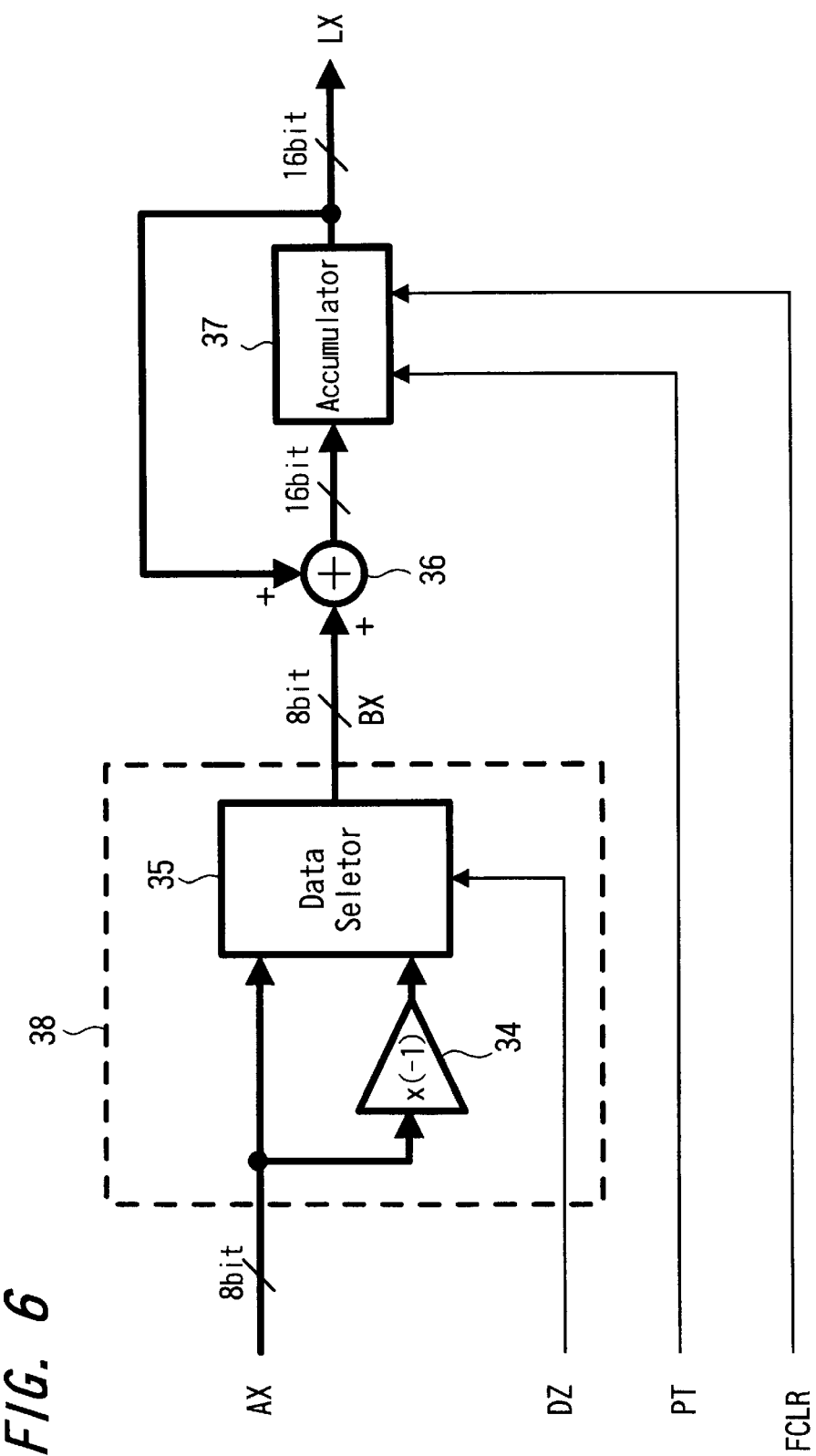
FIG. 6 is a block diagram showing the detailed construction of the inside of a signal processing circuit 21 shown in FIG. 3.

The construction of the signal processing circuit 21 is illustrated in FIG. 6.

A coefficient multiplier 34 outputs polarity inverted data obtained by multiplying the offset reduced output AX by (−1) to a data selector 35. The data selector 35 selects the polarity inverted data or the offset reduced output AX in accordance with the M series latch output DZ and outputs the selected one to an adder 36. That is, when the M series latch output DZ is the logic "0", the polarity inverted data is outputted. When the M series latch output DZ is the logic "1", the offset reduced output BX is outputted.

The adder 36 is a 16-bit digital adder and code-extends the offset reduced output BX to 16 bits. The data is added with the output data of an accumulator 37 and a resultant data is outputted. The accumulator 37 comprises a 16-bit memory for holding the output data of the adder 36 and feeds the held data back to the adder 36, thereby constructing an accumulation adder with the adder 36. That is, the accumulator 37 clears the held data by the clear signal FCLR and, after that, takes in output data of the adder 36 at the timing of the pit detection signal PT. The adder 36 accumulates outputs of the data selector 35 every frame and outputs an accumulation value LX.

In FIG. 3, a binary-coding circuit 22 binary-codes the accumulation value LX by comparing it with a predetermined reference value at the timing of the set signal FSET and outputs a binary-coded output to an ECC circuit 23. The ECC circuit 23 performs error correction on the disc identification data by using a disc identification sync pattern and a disc identification error correction code included in the binary-coded output of the binary-coding circuit 22 and outputs the error-corrected disc identification data D2.

An influence exerted by the offset component when the disc identification code is reproduced without reducing an offset component in the modulation part data SX shown in FIG. 5 as shown in the foregoing embodiment will now be described.

In FIG. 5, the value of the modulation part data SX extracted from the reproduction RF signal RF is set as Vi, A is set to an offset component of Vi, and $\Delta i$ is set to a modulation component obtained by recording the disc identification code, the value Vi of the modulation part data can be expressed by the following Equation (1).

$$Vi = \Delta i + A \quad (1)$$

The value Vi of the modulation part data is added up in accordance with the M series latch output DZ as shown in FIG. 6 while remaining the offset component A. Assuming now that the number of times when the M series latch output is the logic "0" in one frame is set as $N_0$ and the number of times when the M series latch output is the logic "1" in one frame is set as $N_1$, the reproduction result of one bit of the disc identification code can be expressed by an integration expression of the following Equation (2).

$$\sum_{i}^{N_0+N_1} Vi = \sum_{j}^{N_0}(-1) \times \Delta j + \sum_{k}^{N_1}(+1) \times \Delta k + (N_1 - N_0)A \quad (2)$$

$$= \pm \sum_{i}^{N_0+N_1} |\Delta i| + (N_1 - N_0)A$$

Since recording is performed so that the modulation components $\Delta i$ and $\Delta k$ in the foregoing part of Equation (2) have different signs when the compact disc 1 is manufactured, the first and second terms in the first line of Equation 2 have the same sign.

In the latter part of Equation (2), the first term denotes a signal component for reproducing the disc identification code and the second term denotes a product of the offset component A of Equation 1 and a frequency difference of the M series latch outputs DZ ($N_1-N_0$), that is, a noise component upon reproduction.

Since the frequency difference ($N_1-N_0$) in one frame of the second term is not usually zero, when the number of pits ($N_0+N_1$) in which one bit of the disc identification code is recorded is small and $|\Delta i|$ is also small, the offset component A exerts a large influence on the reproduction of the disc identification code. It will be consequently understood that the offset reducing process on the modulation part data SX is effective.

Although the example where the invention is applied to the EFM signal has been described in the foregoing embodiment, the invention is not limited to the example but can be applied to almost all of modulations such as 1–7 modulation, 2–7 modulation, 8–16 modulation and so on.

Further, although the case of binary-coding and reproducing the digital audio signal and the disc identification code has been described in the foregoing embodiment, the invention is not limited to the case but can be applied to various identifying methods such as Viterbi decoding or the like.

Further, although the case of recording desired data by using pits and lands has been described in the foregoing embodiment, the invention is not limited to the case but can be widely applied to the case of recording desired data by using marks and spaces.

Further, although the case of applying the invention to the compact disc and its peripheral apparatus and recording the audio signal has been described in the foregoing embodiment, the invention is not limited to the case but can be widely applied to various optical disks such as a video disk or the like and its peripheral apparatus.

In FIG. 3 shown in the above-mentioned embodiment, the analog-to-digital converter 12 is operated at the channel clocks CCK and an output of the analog-to-digital converter is sampled by the sample and hold circuit 15 at the timing of the pit detection signal PT. It is also possible to supply the pit detection signal PT to the analog-to-digital converter 12 and sample the reproduction RF signal RF.

In FIG. 5 shown in the embodiment, the frequency divider 28 and the shifter circuit 32 have the construction of obtaining an offset in the 64 ($=2^6$, 6 bits) samples. A construction of obtaining an offset in samples of a power of 2 can be also used. In case of using a construction of obtaining an offset in Q samples which is not a power of 2, the frequency divider 28 is replaced to a frequency diviner for outputting the pit detection signal PT once every Q times and the shifter circuit 32 is replaced to a dividing circuit for dividing an output of the sample and hold circuit 31 by Q.

Further, although the offset detecting block 27 is constructed by the frequency divider 28, adder 29, accumulator 30, sample and hold device 31, and shifter 32 in the foregoing embodiment, it can be also constructed by a low pass filter for passing frequency components in the low band and blocking frequency components in the high band or an averaging filter.

The offset reducer 16 may be also realized by a high pass filter for blocking frequency components in the low band and passing frequency components in the high band.

The offset detecting block 27 surrounded by the dotted line in FIG. 5 shown in the embodiment detects an offset irrespective of the region in which one bit of sub data is recorded. A construction of detecting an offset in association with the region in which one bit of the sub data is recorded may be also used.

In FIG. 6 shown in the embodiment, the coefficient multiplier 34 may be a complimenter. Further, as the block 38 surrounded by the dotted line in the diagram, a coefficient multiplier with a selecting function of setting the coefficient to either +1 or −1 in accordance with the M series latch output DZ may be used.

Figure 7:
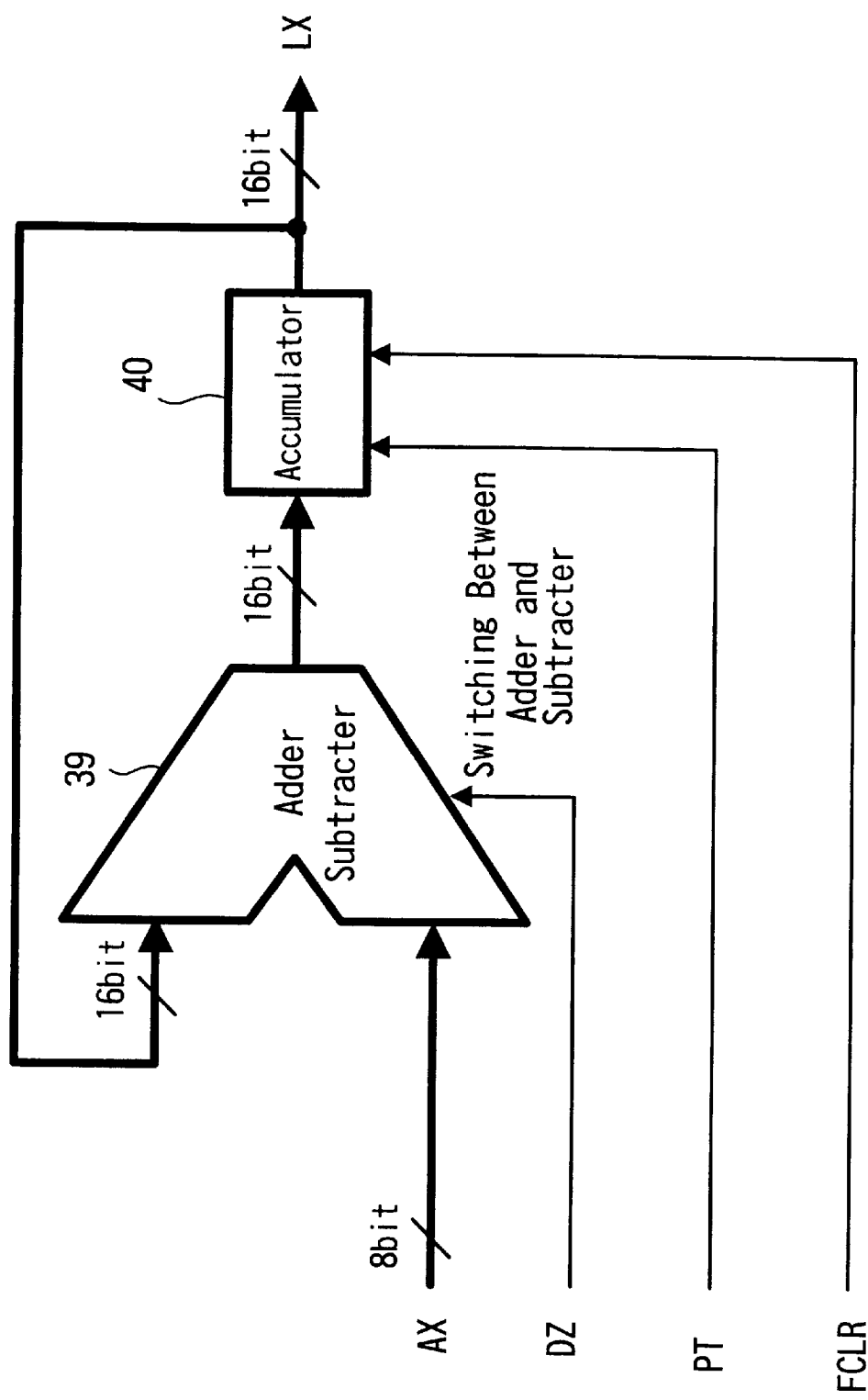
FIG. 7 is a block diagram illustrating the detailed construction of the inside of another signal processing circuit shown in FIG. 3.

The signal processing circuit 21 shown in the embodiment may be constructed by using an adder-subtracter 39 which is switched between addition and subtraction and an accumulator 40 as illustrated in FIG. 7. In this case, an output of the adder-subtracter 39 and an input of the accumulator 40 are connected. An output IX of the accumulator 40 is connected to one of inputs of the adder-subtracter 39 and the offset reduced output AX is connected to the other input.

The adder-subtracter 39 adds/subtracts the offset reduced output AX to/from the inputted accumulator output IX in accordance with the M series latch output DZ. Specifically, when the M series latch output DZ is the logic "0", the offset reduced output AX is subtracted from the accumulator output IX. When the M series latch output DZ is the logic "1", the accumulator output IX and the offset reduced output AX are added and the resultant value is outputted.

The accumulator 40 extracts the output signal IX at the timing of the pit detection signal PT and holds the accumulated value until the clear signal FCLR is inputted.

Although the apparatus for reproducing the optical disc on which the disc identification code as a sub data train is multiplexed and recorded is constructed by a hardware in the foregoing embodiment, a similar function can be realized by a software by using a CPU (microcomputer), a DSP (Digital Signal Processor), and the like.

The optical disk reproducing apparatus of the embodiment for detecting a return light obtained by irradiating an optical disk with a light beam, and processing a reproduction signal whose signal level changes in accordance with the return light, thereby reproducing a data train recorded on the optical disk, comprises: the PLL 7 as a clock reproducing means for reproducing a clock signal on the basis of the reproduction signal; the EFM demodulating circuit 6 as a first reproducing means for reproducing a main data train by identifying a binary value of the reproduction signal by using the clock signal as a reference; and the disc identification code decoding circuit 9 as a second reproducing means for reproducing a sub data train by performing a signal process on the reproduction signal by using the clock signal as a reference, in which the second reproducing means comprises the 8-bit shift register 14 as a signal level detecting means for detecting the signal level of the reproduction signal and outputting a signal level detection result; the offset reducer 16 as an offset reducing means for reducing an offset from the signal level detection result; the M series generating circuit 19 as a signal generating means for generating a predetermined signal series; and the signal processing circuit 21 as a signal processing means for performing a signal process on both the predetermined signal series and an output of the offset reducing means, wherein an output of the signal processing means is identified and the sub data train is reproduced, so that by using the construction of generating an output obtained by reducing the offset component from the detected signal level and performing the signal process, a noise in reproduction of the sub data train can be reduced, so that the S/N (signal-to-noise ratio) is thus made higher and the quality of the reproduced signal can be improved.

Since it is unnecessary to increase the number of pits or lands, or marks or spaces for dispersing and recording the sub data train such as the disc identification code or the like in order to make the S/N (signal-to-noise ratio) higher, in a state where redundant information is unnecessary, time required to reproduce the sub data train is short, and the recording density is not low, the sub data train can be reproduced.

Further, since it is unnecessary to largely modulate the part in which the sub data train is recorded, information can be reproduced while hardly exerting an influence on the reproduction of the main data train and the modulation can be reduced. Thus, it is effective at preventing formation of a pirated optical disc obtained by decoding the sub data.

Moreover, a circuit for correcting deviations in the sample values in a predetermined signal series, and the like are not required at the occasion of reproduction, so that the sub data train can be sufficiently reproduced with a small-scaled simple circuit.

The optical disk reproducing method of the embodiment for reproducing a recorded data train by sequentially detecting pits and lands, or marks and spaces each having a length of an integral multiple of a predetermined basic length, comprises: the clock reproducing process of reproducing the clock signal on the basis of the reproduction signal; the first reproducing method for reproducing a main data train by discriminating a binary value of the reproduction signal by using the clock signal as a reference; in which the second reproducing method for reproducing a sub data train by processing the reproduction signal by using the clock signal as a reference, in which the second reproducing method comprises the signal level detecting process of detecting the signal level of the reproduction signal; the offset reducing process of reducing an offset component from the detected signal level; the signal generating process of generating a predetermined signal series; and the signal process to be performed on the predetermined signal series and an output of the offset reducing means, wherein an output of the signal process is identified and the sub data train is reproduced so that by employing the construction of generating an output obtained by reducing the offset component from the detected signal level and performing the signal process by using the output, a noise in the reproduction of the sub data train can be reduced and the S/N (signal-to-noise ratio) can be made higher.

Since it is unnecessary to increase the number of pits or lands, or marks or spaces for recording the sub data train such as the disc identification code in order to improve the S/N (signal-to-noise ratio), the sub data train can be reproduced in a state where time required to reproduce the sub data train is short and the recording density is not low.

Further, since it is unnecessary to largely modulate the part in which the sub data train is recorded, information can be reproduced while hardly exerting an influence on the reproduction of the main data train and the modulation can be reduced. Thus, it is effective at preventing formation of a pirated optical disc made by decoding the sub data.

Moreover, a process for correcting deviations in the sample value in a predetermined signal series is not required at the occasion of reproduction, so that the sub data train can be sufficiently reproduced with a small-scaled simple circuit.

The optical disk reproducing apparatus of the invention for detecting a return light obtained by irradiating an optical disk with a light beam and processing a reproduction signal whose signal level changes in accordance with the return light, thereby reproducing a data train recorded on the optical disk, comprises: the clock reproducing means for reproducing a clock signal on the basis of the reproduction signal; the first reproducing means for reproducing a main data train by identifying a binary value of the reproduction signal by using the clock signal as a reference; and the second reproducing means for reproducing a sub data train by performing a signal process on the reproduction signal by using the clock signal as a reference, in which the second reproducing means comprises the signal level detecting means for detecting the signal level of the reproduction signal and outputting a signal level detection result; the offset reducing means for reducing an offset from the signal level detection result; the signal generating means for generating a predetermined signal series; and the signal processing means for performing a signal process on both the predetermined signal series and an output of the offset reducing means, wherein an output of the signal processing means is identified and the sub data train is reproduced so that by using the construction of generating an output obtained by reducing the offset component from the detected signal level and performing the signal process by using the output, a noise in reproduction of the sub data train can be reduced. An effect such that the S/N (signal-to-noise ratio) is thus made higher and the quality of the reproduced signal can be improved is produced.

Since it is unnecessary to increase the number of pits or lands, or marks or spaces for dispersing and recording the sub data train such as the disc identification code in order to make the S/N (signal-to-noise ratio) higher, an effect such that the sub data train can be reproduced in a state where redundant information is unnecessary, time required to reproduce the sub data train is short, and the recording density is not low is produced.

Further, since it is unnecessary to largely modulate the part in which the sub data train is recorded, information can be reproduced while hardly exerting an influence on the reproduction of the main data train and the modulation can be reduced. Thus, it is effective at preventing formation of a pirated optical disc obtained by decoding the sub data.

Moreover, a circuit for correcting deviations in the sample values in a predetermined signal series, and the like are not required at the occasion of reproduction, so that the sub data train can be sufficiently reproduced with a small-scaled simple circuit.

The optical disk reproducing method of the invention for reproducing a recorded data train by sequentially detecting pits and lands, or marks and spaces each having a length of an integral multiple of a predetermined basic length, comprises the clock reproducing process of reproducing the clock signal on the basis of the reproduction signal; the first reproducing method for reproducing a main data train by discriminating a binary value of the reproduction signal by using the clock signal as a reference; and the second reproducing method for reproducing a sub data train by processing the reproduction signal by using the clock signal as a reference, in which the second reproducing method comprises the signal level detecting process of detecting the signal level of the reproduction signal; the offset reducing process of reducing an offset component from the detected signal level; the signal generating process of generating a predetermined signal series; and the signal process to be performed on the predetermined signal series and an output of the offset reducing means, wherein an output of the signal process is identified and the sub data train is reproduced. Consequently, by employing the construction of generating an output obtained by reducing the offset component from the detected signal level and performing the signal process by using the output, a noise in the reproduction of the sub data train can be reduced, so that an effect such that the S/N (signal-to-noise ratio) can be made higher is produced.

Since it is unnecessary to increase the number of pits or lands, or marks or spaces for recording the sub data train such as the disc identification code in order to improve the S/N (signal-to-noise ratio), an effect such that the sub data train can be reproduced in a state where time required to reproduce the sub data train is short and the recording density is not low is produced.

Further, since it is unnecessary to largely modulate the part in which the sub data train is recorded, information can be reproduced while hardly exerting an influence on the reproduction of the main data train and the modulation can be reduced. Thus, it is effective at preventing formation of a pirated optical disc made by decoding the sub data.

Moreover, since a process for correcting deviations in the sample value in a predetermined signal series, and the like are not required at the occasion of reproduction, an effect such that the sub data train can be sufficiently reproduced with a small-scaled simple circuit is produced.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A reproducing apparatus for reproducing an optical disc in which main data is recorded as a mark or space subjected to a run length limited coding process and sub data is subjected to a modulation process in a width direction of a mark or space having a predetermined run length and is recorded, comprising:

a reproducing means for irradiating a light on the mark or space on the optical disc and generating a reproducing signal based on a reflection signal from the optical disc;

a binary-coding means for binary-coding the reproducing signal reproduced by the reproducing means;

a clock generating means for generating a clock signal based on a signal binary-coded by the binary-coding means;

a mark/space detecting means for detecting a mark or space having the predetermined run length based on the clock signal from the clock generating means and the binary-coded signal from the binary-coding means;

an A/D converting means for converting a reproduced signal from the reproducing means into a digital signal based on the clock signal from the clock generating means;

a sample and hold means for sampling and holding the digital signal converted by the A/D converting means based on a detected result of the mark/space detecting means;

an offset reducing means for removing an offset of a sampled and held signal from the sample and hold means; and a demodulating means for demodulating sub data subjected to a modulating process in a width direction of the mark or space having the predetermined run length and then recorded based on the sampled and held signal the offset of which is removed by the offset reducing means.

2. A reproducing apparatus according to claim 1, characterized in that the offset reducing means comprises:

an arithmetic means for accumulating the sampled and held signal from the sample and hold means in a predetermined interval and dividing the accumulated result in a predetermined interval to calculate an offset; and a subtracting means for subtracting the offset of the arithmetic means from the sampled and held signal of the sample and holding means.

3. A reproducing apparatus according to claim 1, characterized in that the offset reducing means comprises:

an offset extracting means for extracting only a low frequency component of the sampled and held signal from the sample and hold means; and a subtracting means for subtracting the offset of the offset extracting means from the sampled and held signal of the sample and hold means.

4. A reproducing apparatus according to claim 1, characterized in that the offset reducing means comprises:

an offset extracting means for extracting only a high frequency component of the sampled and held signal from the sample and hold means; and a subtracting means for subtracting an offset of the offset extracting means from the sampled and held signal of the sample and hold means.

5. A reproducing apparatus according to claim 1, characterized in that the signal processing means comprises:

a sign reversing means for reversing a sign of an output from the offset reducing means;

a selecting means for selecting either an output of the offset reducing means or an output of the sign reversing means; and an accumulating means for accumulating an output of the selecting means in a predetermined interval.

6. A reproducing apparatus according to claim 1, characterized in that the signal processing means comprises:

a complementing means for obtaining one complement of an output of the offset reducing means;

a selecting means for selecting an output of the complementing means or an output of the offset reducing means; and an accumulating means for accumulating an output of the selecting means in a predetermined interval.

7. A reproducing apparatus according to claim 1, characterized in that the signal processing means comprises:

an arithmetic means for adding or subtracting an output of the offset reducing means to/from an output of holding means; and a control means for changing-over the adding and the subtracting of the arithmetic means, wherein the holding means holds the output from the arithmetic means.

8. A reproducing apparatus according to claim 1, characterized by, further comprising:

a random number generating means for generating a random number based on the clock from the clock generating means; and a timing generating means for generating a timing at an edge of the mark or space based on the random number generated by the random number generating means.

9. A reproducing apparatus according to claim 8, characterized in that the signal processing means comprises:

a sign reversing means for reversing a sign of an output of the offset reducing means;

a selecting means for selecting either an output of the sign reversing means or an output of the offset reducing means; and an accumulating means for accumulating an output of the selecting means in a predetermined interval, wherein the selecting means is changed over based on the timing of the timing generating means.

10. A reproducing apparatus according to claim 8, characterized in that the signal processing means comprises:

a complementing means for obtaining one complement of an output of the offset reducing means;

a selecting means for selecting an output of the complementing means or an output of the offset reducing means; and an accumulating means for accumulating an output of the selecting means in a predetermined interval, wherein the selecting means is changed over based on the timing of the timing generating means.

11. A reproducing apparatus according to claim 8, characterized in that the signal processing means comprises:

an arithmetic means for adding or subtracting an output of the offset reducing means to/from an output of holding means; and a control means for changing the adding and the subtracting of the arithmetic means, wherein the holding means holds an output from the arithmetic means and the control means changes over the selecting based on the timing of the timing generating means.

12. A reproducing apparatus according to claim 1, characterized in that the sub data is a key for decoding encryption of the main data.

13. A reproducing apparatus according to claim 1, characterized in that the sub data is information for identifying the disc.

14. A reproducing method for reproducing an optical disc in which main data is recorded as a mark or space subjected to a run length limited coding process and sub data is subjected to a modulation process in a width direction of a mark or space having a predetermined run length and is recorded, comprising the steps of:

a step for irradiating a light on the mark or space on the optical disc and generating a reproduced signal based on a reflection signal from the optical disc;

a step for binary-coding the reproduced signal;

a step for generating a clock signal based on a binary-coded signal;

a step for detecting a mark or space having the predetermined run length based on the generated clock signal and the binary-coded signal;

a step for converting the reproduced signal into a digital signal based on the generated clock signal;

a step for sampling and holding the converted digital signal based on a detected result of the mark/space;

a step for removing an offset of the sampled and held signal; and a step for demodulating sub data subjected to a modulating process in a width direction of the mark or space having the predetermined run length and then recorded based on the sampled and held signal the offset of which is removed.

* * * * *